(12) United States Patent
Chao et al.

(10) Patent No.: US 11,416,766 B2
(45) Date of Patent: Aug. 16, 2022

(54) MISTAKEN MESSAGE PREVENTION BASED ON MULTIPLE CLASSIFICATION LAYERS

(71) Applicant: International Business Machines Corporation, Armonk, NY (US)

(72) Inventors: Tzu-Chen Chao, Taipei (TW); Ching-Chun Liu, Taipei (TW); Ci-Wei Lan, Keelung (TW); Tao-Hung Jung, New Taipei (TW); Yu-Siang Chen, Pijiao (TW)

(73) Assignee: International Business Machines Corporation, Armonk, NY (US)

( * ) Notice: Subject to any disclaimer, the term of this patent is extended or adjusted under 35 U.S.C. 154(b) by 948 days.

(21) Appl. No.: 16/186,626

(22) Filed: Nov. 12, 2018

(65) Prior Publication Data

US 2020/0151620 A1   May 14, 2020

(51) Int. Cl.
| | | |
|---|---|---|
| *G06F 15/16* | (2006.01) | |
| *G06N 20/00* | (2019.01) | |
| *G06N 7/00* | (2006.01) | |
| *H04L 51/216* | (2022.01) | |

(52) U.S. Cl.
CPC ............ *G06N 20/00* (2019.01); *G06N 7/005* (2013.01); *H04L 51/216* (2022.05)

(58) Field of Classification Search
CPC ........ G06N 20/00; G06N 7/005; G06N 3/084; H04L 51/16; H04L 51/12; H04L 51/216
See application file for complete search history.

(56) References Cited

U.S. PATENT DOCUMENTS

| | | | |
|---|---|---|---|
| 8,533,840 B2 * | 9/2013 | Redlich | G06F 21/6245 707/708 |
| 9,313,166 B1 * | 4/2016 | Zeng | G06Q 10/107 |
| 9,560,003 B2 | 1/2017 | Shuster | |
| 9,866,511 B2 | 1/2018 | Abou Mahmoud | |
| 9,985,918 B2 | 5/2018 | Caliendo, Jr. | |
| 10,200,237 B1 * | 2/2019 | Gupta | H04L 12/1859 |
| 10,749,818 B1 * | 8/2020 | Bikumala | H04L 51/20 |
| 10,862,838 B1 * | 12/2020 | Bodapati | H04W 8/18 |

(Continued)

OTHER PUBLICATIONS

Disclosed Anonymously, "Intelligently avoid sending instant messages inadvertently to unintended recipients", An IP.com Prior Art Database Technical Disclosure, IBM.com No. IPCOM000251785D, IP.com Electronic Publication Date: Dec. 4, 2017, 5 pages.

*Primary Examiner* — Anthony Mejia
(74) *Attorney, Agent, or Firm* — Randy E. Tejeda (57) ABSTRACT

In an approach to detecting the transmission of messages, analyzing said messages, calculating a message risk score and transmitting a warning notification, one or more computer processors detect transmission of a message from a user to a selected recipient. The one or more computer processors extract message information from the detected message. The one or more computer processors retrieve one or more historical conversations between the user and the selected recipient of the detected message. The one or more computer processors determine a risk score corresponding to sending the detected message to the selected recipient based on applying the extracted message information and the retrieved historical conversations to a cognitive model.

19 Claims, 4 Drawing Sheets

(56) References Cited

U.S. PATENT DOCUMENTS

| | | | |
|---|---|---|---|
| 11,102,244 B1* | 8/2021 | Jakobsson | H04L 63/1491 |
| 2006/0271381 A1* | 11/2006 | Pui | G06Q 10/10 |
| | | | 705/301 |
| 2015/0312197 A1 | 10/2015 | Dong | |
| 2017/0257333 A1 | 9/2017 | Kaplinger | |
| 2018/0048613 A1 | 2/2018 | Abou Mahmoud | |
| 2019/0197479 A1* | 6/2019 | Huang | H04L 51/34 |
| 2019/0364001 A1* | 11/2019 | Dotan-Cohen | H04L 51/24 |

* cited by examiner

05/25/2017 @ 4:38pm
Minerva: "How was the business trip?"

05/25/2017 @ 4:40pm
Fai: "It was fantastic. I closed three clients."

05/25/2017 @ 4:41pm
Minerva: "Wow, that's amazing. Think you will get a good bonus?"

05/25/2017 @ 4:41pm
Fai: "Most likely, I got to pay off that new pool somehow."

05/25/2017 @ 4:42pm
Minerva: "You better have a pool party whenever it gets built."

05/25/2017 @ 4:45pm
Fai: "Of course. Do you have any dinner plans?"

05/25/2017 @4:46pm
Minerva: "Tonight I have my parents over for dinner but tomorrow I am free."

05/25/2017 @ 4:48pm
Fai: "Tomorrow it is!"

MISTAKEN MESSAGE PREVENTION BASED ON MULTIPLE CLASSIFICATION LAYERS

BACKGROUND

The present invention relates generally to the field of messaging, and more particularly to predicting and preventing sending messages to unintended recipients using multiple classification layers.

A graph database is a database that uses graphic structures for semantic queries with nodes, edges, and properties to represent and store data. A key concept of the system is the graph (or edge or relationship), which directly relates data items in the store. The relationships allow data in the store to be linked together directly, and in many cases retrieved with one operation. Nodes represent entities such as people, businesses, accounts, or any other item to be tracked. The nodes are roughly the equivalent of the record, relation, or row in a relational database, or the document in a document database. Edges, also termed graphs or relationships, are the lines that connect nodes to other nodes; they represent the relationship between them. Meaningful patterns emerge when examining the connections and interconnections of nodes, properties, and edges. Edges are the key concept in graph databases, representing an abstraction that is not directly implemented in other systems. Properties are germane information to nodes.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised).

In pattern recognition and machine learning, a feature vector is an n-dimensional vector of numerical features that represent some object. Many algorithms in machine learning require a numerical representation of objects, since such representations facilitate processing and statistical analysis. Feature vectors are equivalent to the vectors of explanatory variables used in statistical procedures such as linear regression. Feature vectors are often combined with weights using a dot product in order to construct a linear predictor function that is used to determine a score for making a prediction.

A multilayer perceptron (MLP) is a class of feedforward artificial neural network. An MLP consists of, at least, three layers of nodes: an input layer, a hidden layer and an output layer. Except for the input nodes, each node is a neuron that uses a nonlinear activation function. MLP utilizes a supervised learning technique called backpropagation for training. Its multiple layers and non-linear activation distinguish MLP from a linear perceptron. It can distinguish data that is not linearly separable.

SUMMARY

Embodiments of the present invention disclose a method, a computer program product, and a system for detecting the transmission of messages, analyzing said messages, calculating a message risk score and transmitting a warning notification. The method includes one or more computer processors detecting transmission of a message from a user to a selected recipient. The one or more computer processors extract message information from the detected message. The one or more computer processors retrieve one or more historical conversations between the user and the selected recipient of the detected message. The one or more computer processors determine a risk score corresponding to sending the detected message to the selected recipient based on applying the extracted message information and the retrieved historical conversations to a cognitive model.

DETAILED DESCRIPTION

Electronic messaging (e.g., email, text messaging, instant messaging, etc.) is increasingly becoming the predominant method of communication. Unlike traditional communications methods such as face-to-face and telephone conversations, electronic messaging systems lack traditional recipient indicators (e.g., recognizing the recipient's voice or face) that assist in determining whether the selected recipient is in fact the intended recipient. Furthermore, this problem is exasperated by including multiple recipients in group chats or emails. Each addition of a new recipient in these group situations exponentially increases the risk of an unintended message. In current messaging systems, recipients in group chats may be given a different color and/or a small icon to help distinguish and differentiate recipients from each other. This method of differentiation is wholly lacking and lends to messages being sent to unintended recipients. Furthermore, the issue is compounded when users have multiple electronic conversations active.

Current methods of mistaken text prevention involve specifying a message delay that allows a user to unsend a message if the user realizes the mistake within the delay period. Once a user sends a message, there is little a user can do to prevent the unintended recipient from receiving the message. Embodiments of the present invention recognize that electronic messaging is improved by analyzing messages, calculating recipient probabilities and preventing messages being sent to unintended recipients. Embodiments of the present invention further recognize that providing a system that trains and utilizes a message prediction classification model minimizes the amount of resources needed to effectively analyze and predict a message recipient. Implementation of embodiments of the invention may take a variety of forms and exemplary implementation details are discussed subsequently with reference to the Figures.

The present invention will now be described in detail with reference to the Figures.

Figure 1:
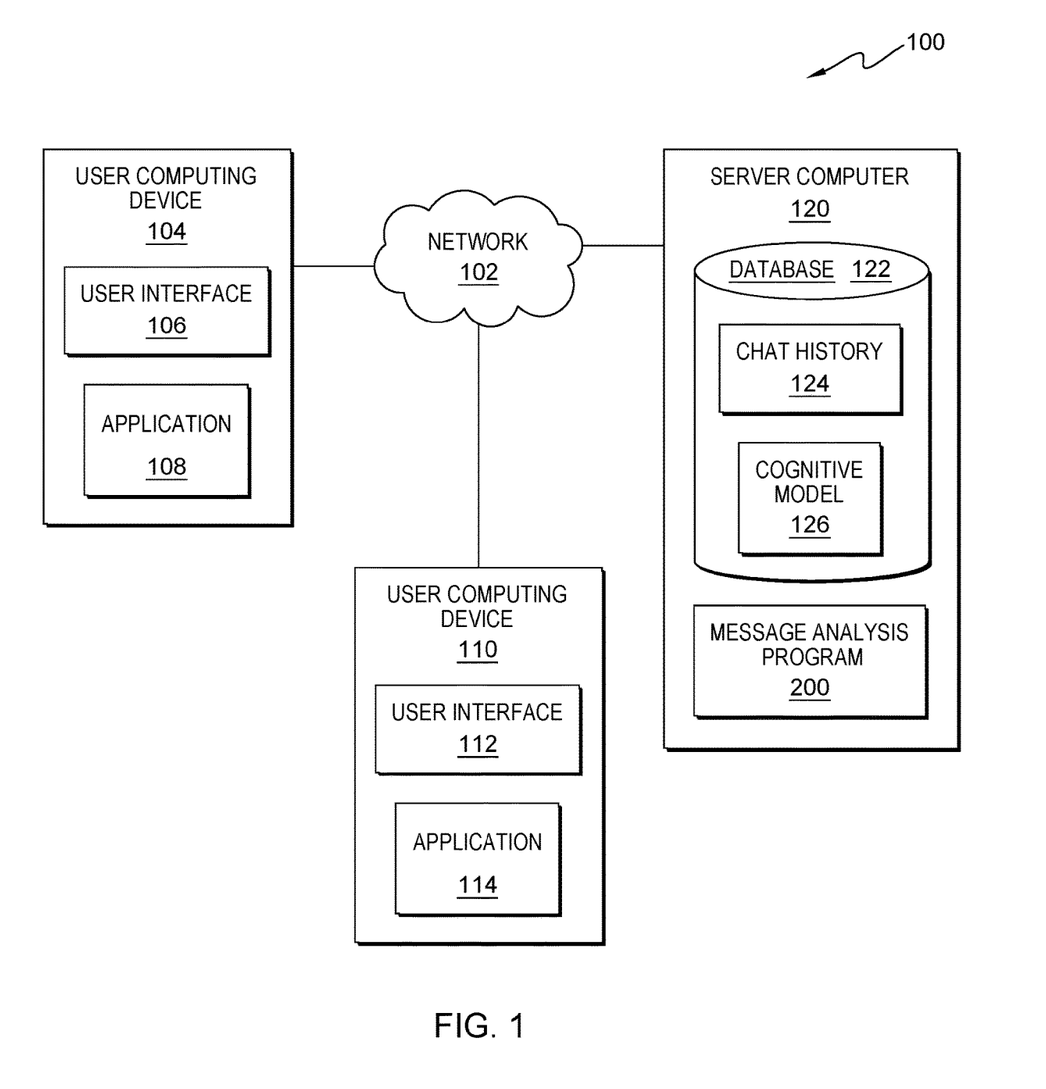
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes user computing device 104, user computing device 110, and server computer 120, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between user computing device 104, user computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

User computing device 104 and user computing device 110 may be a web server or any other electronic device or computing system capable of processing program instructions and receiving and sending data. In some embodiments, user computing device 104 and user computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, user computing device 104 and user computing device 110 may represent a server computing system utilizing multiple computers as a server system, such as in a cloud computing environment. In general, user computing device 104 and user computing device 110 are representative of any electronic device or combination of electronic devices capable of executing machine readable program instructions as described in greater detail with regard to FIG. 4, in accordance with embodiments of the present invention. User computing device 104 contains user interface 106 and application 108 and user computing device 110 contains user interface 112 and application 114.

User interface 106 and user interface 112 are programs that provide an interface between user computing device 104, user computing device 110 and a plurality of applications that reside on user computing device 104 and user computing device 110 (e.g., application 108 and application 114) and may be accessed over network 102. A user interface, such as user interface 106 and user interface 112, refer to the information (e.g., graphic, text, sound) that a program presents to a user and the control sequences the user employs to control the program. A variety of types of user interfaces exist. In one embodiment, user interface 106 and user interface 112 may be graphical user interfaces (GUIs) or web user interfaces (WUIs). A GUI is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. A WUI accepts input and provides output by generating web pages viewed by the user using a web browser program. In an example embodiment, user interface 106 and user interface 112 send and receive information through application 108 and application 114, respectively, to message analysis program 200.

In some embodiments, a user of user computing device 104 and user computing device 110 can interact with user interface 106 and user interface 112 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate user interface 106 and user interface 112 operating within the GUI environment of user computing device 104 and user computing device 110. User interface 106 and user interface 112 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, user interface 106 or user interface 112 may receive input in response to a user of user computing device 104 and user computing device 110 utilizing natural language, such as written words or spoken words that user computing device 104 and user computing device 110 identifies as information and/or commands.

Application 108 and application 114 are a set of one of more programs designed to transmit and receive messages (e.g., text messaging, instant messaging, emails, web conferencing, text-to-speech, etc.). In the depicted embodiment, application 108 and application 114 reside on user computing device 104 and user computing device 110 respectively. In another embodiment, application 108 and application 114 may reside on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with user computing device 104, user computing device 110, and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and message analysis program 200. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by message analysis program 200. In the depicted embodiment, database 122 resides on server computer 120. In another embodiment, database 122 may reside on user computing device 104, user computing device 110 or elsewhere within computational environment 100 provided message analysis program 200 has access to database 122. A database is an organized collection of data. Database 122 can be implemented with any type of storage device capable of storing data and configuration files that can be accessed and utilized by message analysis program 200, such as a database server, a hard disk drive, or a flash memory. In the depicted embodiment, database 122 includes chat history 124 and cognitive model 126. In a further embodiment, database 122 is a graph database where message recipients are nodes and previous conversations are the links between the nodes along with the associated conversation metadata.

Figure 3:
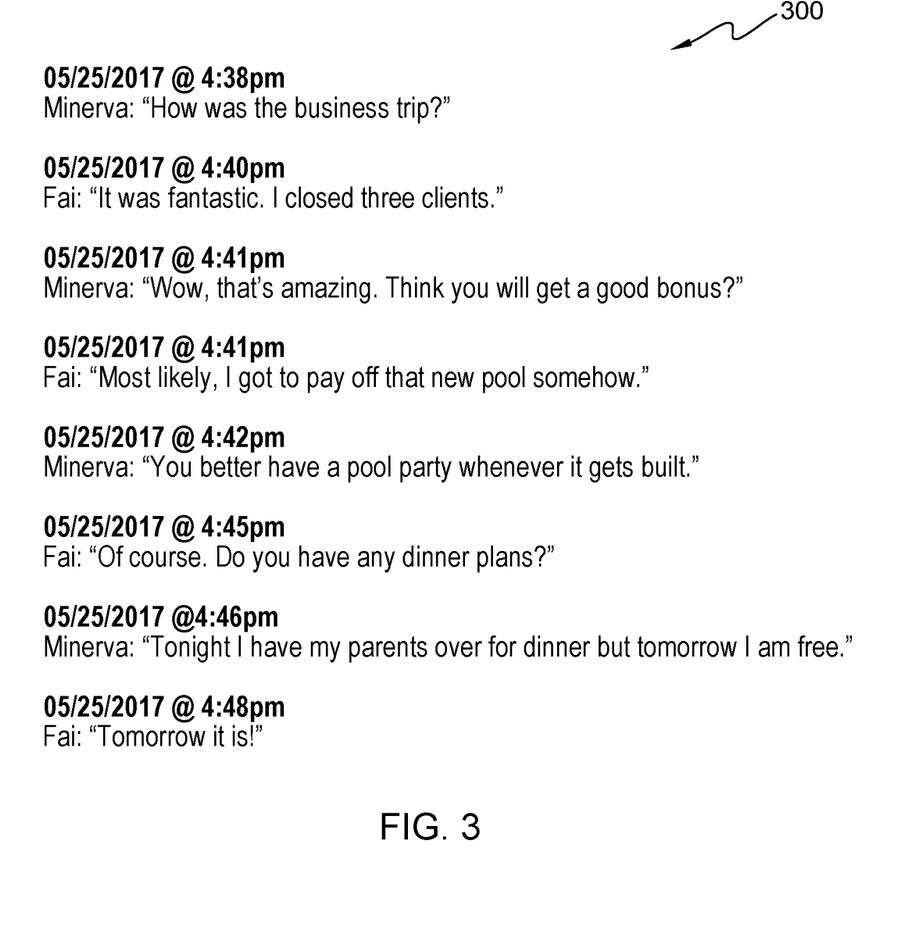
FIG. 3 depicts historical conversation 300, which is an example of a conversation between two employees in a business context, in accordance with an embodiment of the present invention.

Chat history 124 contains one or more historical conversations with a determined recipient. FIG. 3 illustrates example conversation 300, an example stored conversation between two users that is stored in chat history 124. In an embodiment, chat history 124 contains the raw unprocessed messages. In another embodiment, chat history 124 may include a series of vectors corresponding to a plurality of determined features such as message sentiment, behavior, intention, sentence/word complexity, etc. In an embodiment, chat history 124 may be represented as a graph database, where the messages are stored in relation to the recipients forming sequences of similar message/recipient combinations.

Cognitive model 126 utilizes deep learning techniques to calculate the recipient probability relative to intended message recipient. Specifically, cognitive model 126 utilizes classification algorithms and models (e.g., multilayer perceptron, support vector machine (SVM), Bayes network, decision trees, logistic regression, neural networks, etc.) that can be trained with supervised and/or unsupervised methods. In the depicted embodiment, cognitive model 126 utilizes a multilayer perceptron (MLP) trained using supervised training methods. In an embodiment, cognitive model 126 utilizes associated independent classification layers with both supervised and unsupervised methods. MLP is advantageous over conventional learning techniques because the training is fast, thus saving computing time and resources. In addition, MLP is an effective method for correlating different types of features from diverging and distinct data.

Cognitive model 126 assesses a message by considering different features, available as structured or unstructured data, and applying relative weights. Message analysis program 200 feeds a vectorized training set of feature data to cognitive model 126. In various embodiments, the data is labeled with the correct recipient enabling cognitive model 126 to learn what message features are correlated to a specific recipient, prior to use. The training set includes examples of a plurality of features, likely message recipients, associated risks, etc. Cognitive model 126 is trained to recognize the difference between messages intended for different recipients. In addition, cognitive model 126 is trained to recognize the severity of a message being sent to an unintended recipient, such as the difference between a message intended for a friend but instead being mistakenly sent to an employer. Cognitive model 126 learns from the training set of data to distinguish between likely and unlikely message recipients. Once trained, cognitive model 126 can assign a weight or probability to the occurrence of an unintended recipient based on the data aggregated by message analysis program 200. The training of cognitive model 126 is depicted and described in further detail with respect to FIG. 2.

Message analysis program 200 is a program for determining whether to transmit a message by detecting, analyzing, extracting and creating feature vectors from one or more transmitted messages. In an embodiment, message analysis program 200 may perform preprocessing techniques (e.g., removing stop words, extracting contextual words, applying weights, etc.) on entire conversations or message fragments. In an embodiment, message analysis program 200 receives messages and associated metadata from users of application 108 and application 114. In another embodiment, message analysis program 200 aggregates associated messages with applicable data stored in database 122, thus creating message information. Applicable data may be any information that is associated with the intended recipient of the message, such as historical conversations with the said recipient, associated feature vectors, temporal metadata (conversations lengths, conversations temporal conditions, etc.) and sentence complexity. Message analysis program 200 feeds the message information into a cognitive model (e.g., cognitive model 126) that can calculate the probability and/or risk of the message being transmitted to an unintended recipient and, if so, possible ramifications. If the predicted probability and risk of the message exceed a threshold, then message analysis program 200 notifies the user. Message analysis program 200 logs the message and the recipient into chat history 124.

In the depicted embodiment, message analysis program 200 resides on server computer 120. In another embodiment, message analysis program 200 may reside on user computing device 104. In another embodiment, message analysis program 200 includes an instance of cognitive model 126. Message analysis program 200 is depicted and described in further detail with respect to FIG. 2.

In various embodiments, the term "recipient" should be construed having a broad meaning and include all types and categories of entities. In another embodiment, the term "recipient" may be construed to include a single entity or multitude of entities contained in a conversation. For example, in an email chain or a group text message, the term recipient is construed to include the group of entities.

Figure 2:
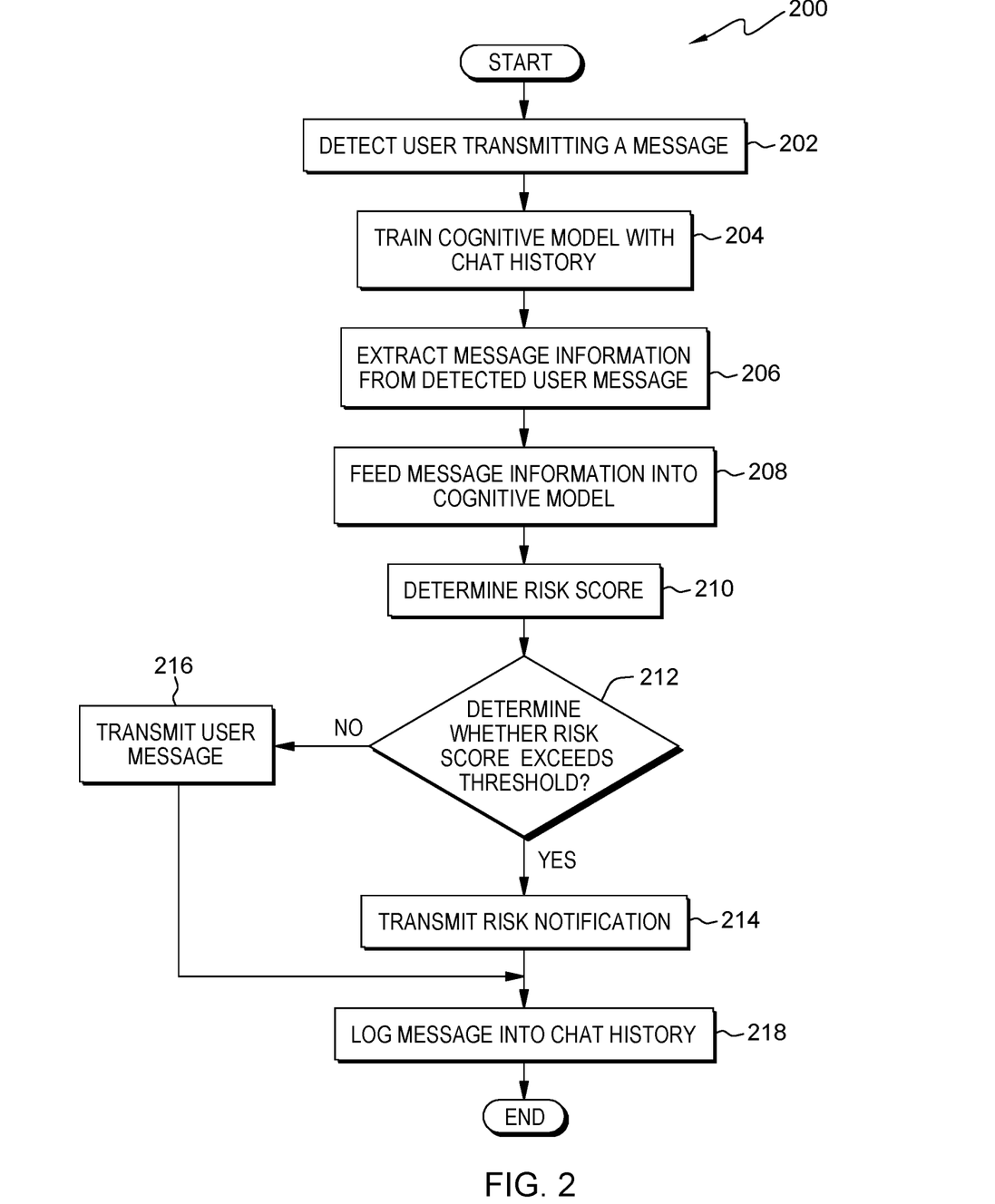
FIG. 2 is a flowchart depicting operational steps of a message analysis program, on the computer within the computational environment of FIG. 1, for detecting the transmission of messages, analyzing said messages, calculating a message risk score and transmitting a warning notification, in accordance with an embodiment of the present invention.

FIG. 2 is a flowchart depicting operational steps of message analysis program 200, on server computer 120 within computational environment 100 of FIG. 1, for detecting the transmission of messages, analyzing said messages, calculating a message risk score and transmitting a warning notification, in accordance with an embodiment of the present invention.

Message analysis program 200 detects a user transmitting a message (e.g., email, instant message, direct message, text message, social media post, etc.) (step 202). In an embodiment, message analysis program 200 prevents transmission of one or more detected messages until the recipient risk score is calculated (as detailed in step 208). In various embodiments, message analysis program 200 replaces and/or substitutes a graphical transmission icon within a user interface (e.g., user interface 106). For example, messaging applications (e.g., application 108 and application 114) have graphical icons that when activated transmit a typed message. In this example, message analysis program 200 replaces one or more icons, with the respective triggers, to intercept and retain the message before transmission. In yet another embodiment, message analysis program 200 may analyze outbound traffic of user computing device 104 to detect the transmission of a message. In this embodiment, message analysis program 200 may retain the message until the message is analyzed and approved by the user.

In yet another embodiment, message analysis program 200 detects a message by detecting the user entering words in a messaging application (e.g., application 108 or application 114). In a further embodiment, message analysis program 200 may trigger message analysis in response to every word or sentence the user inputs. In an alternative embodiment, message analysis program 200 may trigger message analysis after the user stops inputting for a specified duration. For example, the user beings to input a message and after 5 seconds of non-input, message analysis program 200 determines the message is ready to be transmitted and thus analyzes the message.

Message analysis program 200 trains a cognitive model with recipient chat history (step 204). In an embodiment, message analysis program 200 trains cognitive model 126 with a plurality of feature vectors originating from message information extracted from the recipient specific historical messages/conversations located in chat history 124. In an embodiment, message analysis program 200 retrieves all historical messages/conversations with a selected recipient and the user. In another embodiment, message analysis program 200 retrieves a subset of all historical messages/conversations between a selected recipient and the user (e.g., within a defined period of time, a defined quantity, etc.)

FIG. 3 illustrates example conversation 300, an example of a historical conversation between the user Minerva and the recipient Fai. In this example, message analysis program 200 retrieves all historical messages/conversations between Minerva and Fai. Message analysis program 200 analyzes, extracts message information and creates feature vectors from the retrieved historical messages/conversations. In an embodiment, message information includes but is not limited to, intended recipient, message contents, if applicable: message subject line, and temporal message data (timestamp, conversation run times, etc.). In a further embodiment, message analysis program 200 extracts additional message information from the message contents such as message intention, sentiment, behavior, sentence complexity, word complexity and response time.

In another embodiment, message intention categorizes the topic, theme, or purpose the message/conversation. For example, in example conversation 300, message analysis program 200 determines that the intention is a discussion of clients and future dinner plans. In an embodiment, message sentiment categorizes the emotions of the message such as positive, happy, negative, sad, etc. For example, in example conversation 300, message analysis program 200 determined that the sentiment is positive and happy. In an embodiment, message behavior categorizes the degree of message formality such as business, professional, familial, casual, etc. For example, in example conversation 300, message analysis program 200 determined that the behavior is in the professional category. Message analysis program 200 utilizes the aforementioned components of message information as features to train and test cognitive model 126 and to analyze and process future message through trained cognitive model 126.

In an embodiment, message analysis program 200 utilizes natural language processing (NLP) techniques such as syntactic analysis to identify parts of speech and syntactic relations between various portions of a message/conversation. In a further embodiment, message analysis program 200 utilizes part-of-speech tagging to identify the particular part of speech of one or more words in a message based on its relationship with adjacent and related words. For example, message analysis program 200 utilizes the aforementioned techniques to identify the nouns, adjectives, adverbs, and verbs in the example sentence: "Jane, please pick up your billing report". In this example, message analysis program 200 identifies "Jane", "report" as nouns, "pick" as a verb, "please" as an adverb and "billing" as an adjective.

In another embodiment, message analysis program 200 utilizes term frequency-inverse document frequency (tf-idf) techniques to calculate how important a word is to the sentence, conversation, or historical chat history. In another embodiment, message analysis program 200 utilizes tf-idf to calculate a series of numerical weights for the words extracted from historical conversations. In a further embodiment, message analysis program 200 utilizes said calculations to identify and weigh frequently used words. For example, message analysis program 200 increases the weight of a word proportionally to the frequency the word appears in the conversation offset by the frequency of conversations, in chat history 124, that contain the word.

Message analysis program 200 can process the retrieved historical messages/conversations into multiple sets. In an embodiment, message analysis program 200 partitions historical conversations into discrete sets containing differently processed versions of the same conversation. In another embodiment, message analysis program 200 defines the bounds of a conversation by utilizing predetermined response times. For example, if the user does not respond to a message for more than ten hours, then message analysis program 200 determines that any messages sent after the time threshold are a new, distinct conversation. In yet another embodiment, message analysis program 200 defines conversations by identifying the subject of the messages and segmenting the historical conversations into discrete subject buckets or sets, bound by temporal limitations. For example, if in the previous three days, the user wrote messages to a coworker about bonuses, vacation plans, and baseball, then message analysis program 200 identifies each topic and partitions the associated messages into distinct conversations according to the identified topic or theme.

Message analysis program 200 can process each conversation set based on a feature set. For example, if the feature set is based on word complexity, then message analysis program 200 transforms each word into a corresponding stem/root equivalent. In another example, if the intended feature set is based on sentence complexity, then message analysis program 200 removes all stop words and prepositions. In yet another embodiment, message analysis program 200 non-deterministically divides the processed sets into training sets and into test sets. In a further embodiment, message analysis attaches the corresponding intended recipient to each message/conversation as a label.

Message analysis program 200 can vectorize the partitioned message/conversation sets. In an embodiment, message analysis program 200 utilizes one-hot encoding techniques to vectorize categorical or string-based feature sets. For example, when vectorizing feature sets of individual words, message analysis program 200 creates a one-hot vector comprising a 1×N matrix, where N symbolizes the number of distinguishable words. In another embodiment, message analysis program 200 utilizes one-of-c coding to recode categorical data into a vectorized form. For example, when vectorizing an example categorical feature set consisting of [business, personal, casual], message analysis program 200 encodes the corresponding feature set into [[1,0,0], [0,1,0], [0,0,1]]. In another embodiment, message analysis program 200 utilizes featuring scaling techniques (e.g., rescaling, mean normalization, etc.) to vectorize and normalize numerical feature sets.

Message analysis program 200 can train cognitive model 126 by feeding the processed vectors into cognitive model 126. In an embodiment, message analysis program 200 initializes cognitive model 126 with randomly generated weights. In an alternative embodiment, message analysis program 200 initializes cognitive model 126 with weights calculated from the analysis described above (e.g., tf-idf, etc.). In yet another embodiment, message analysis program 200 performs supervised training with the associated classification layers (e.g., perceptron layers, etc.).

Message analysis program 200 can utilize processed training sets to perform supervised training of cognitive model 126. As would be recognized by one skilled in the art, supervised training determines the difference between a prediction and a target (i.e., the error), and back-propagates the difference through the layers such that cognitive model 126 "learns." In an embodiment, message analysis program 200 determines whether a sufficient precision is obtained by utilizing test sets. Message analysis program 200 determines sufficient precision based on a recipient confidence percentage generated by cognitive model 126. By determining the precision, message analysis program 200 minimizes the likelihood of false positives. If the calculated precision is insufficient, then message analysis program 200 continues with supervised training of cognitive model 126. If the calculated precision is sufficient, then message analysis program 200 ends the training process.

Message analysis program 200 extracts message information from the detected user message (step 206). In an embodiment, message analysis program 200 retrieves the detected user message from application 108. In another embodiment, message analysis program 200 receives the raw components (e.g., message intention, sentiment, behavior, sentence complexity, word complexity, response time, etc.) of the message. For example, instead of retrieving the entire message, message analysis program 200 receives a parameterized list of message information components. In a further embodiment, the user inputs said list into message analysis program 200. In another embodiment, the list is transmitted by another application (not depicted).

In an embodiment, message analysis program 200 utilizes NLP techniques to extract message information from the detected message. In this embodiment, the process of message analysis program 200 extracting the message information from the detected user message is described in further detail with regard to step 204. In another embodiment, message analysis program 200 vectorizes the extracted message information. In this embodiment, the vectorization process for an attempted user message is the same process as the vectorization process for a message from a historical message/conversation as described in further detail with regard to step 204.

Message analysis program 200 feeds message information into the cognitive model (step 208). In an example embodiment, message analysis program 200 feeds the extracted message information (from step 206) into cognitive model 126. Cognitive model 126 processes the extracted message information to evaluate the message. By assessing the components of the message information (i.e., message intention, sentiment, behavior, sentence complexity, word complexity, response time, etc.) utilizing the training set of labelled chat history (e.g. chat history 124) as described in step 204, and assigning weights to the various components, message analysis program 200 can utilize cognitive model 126 to characterize the current message and calculate a probability of the likelihood that the selected recipient is in fact the intended recipient.

Message analysis program 200 determines risk score (step 210). In one embodiment, utilizing the output of cognitive model 126, message analysis program 200 determines the probability that the selected recipient is not the intended recipient of the attempted user message. Message analysis program 200 processes the weights and probabilities which cognitive model 126 calculates and assigns to the various components of the message information to determine the likelihood of a message being transmitted to an unintended recipient. The likelihood or probability is represented as a numerical percentage.

In an embodiment, the risk score is the reciprocal of the recipient probability representing the probability that the attempted message is not meant for the selected recipient. For example, in a continuation of the conversation detailed in example conversation 300, the user (Minerva) attempts to transmit the following message "Where should we go to dinner tomorrow?" to recipient (Fai). In this example, message analysis program 200 detects the message, extracts and feeds message information from the message as detailed in step 202, step 206, and step 208 respectively. Here, message analysis program 200 determines that the message has a low probability of risk and assigns a low risk score to the attempted message. In another example, the user (Minerva) continues the conversation detailed in example conversation 300 and attempts to transmit the follow message "Honey, can you please bring home milk". In this example, message analysis program 200 determines that the attempted message is risky due to change in context and the informal nature of the message and assigns the message a high-risk score.

Message analysis program 200 determines whether the risk score exceeds a defined risk threshold (decision block 212). Message analysis program 200 may compare the probabilities (determined in step 208) to a probability threshold in order to determine whether the extracted message information supports transmitting one or more risk notifications with respect to the intended message recipient. In an embodiment, the threshold is a numerical percentage. In a further embodiment, message analysis program 200 compares the recipient probability, calculated as a percentage, to the probability threshold. In various embodiments, the threshold is a user-defined threshold. In yet another embodiment, message analysis program 200 may define the threshold based on the category (e.g. employer, employee, friend, etc.) of recipient or content category of the message. For example, messages directed towards business acquaintances or coworkers have a lower threshold allowing the user to verify potential detrimental work messages.

If message analysis program 200 determines that the risk score exceeds the threshold ("yes" branch, decision block 212), then message analysis program 200 transmits a risk notification (step 214). In an embodiment, the risk notification contains the name of the intended recipient and a numerical representation of the risk score. In another embodiment, message analysis program 200 converts the risk score into a categorical degree of risk such as "high-risk" or "low-risk" dependent on either user defined thresholds or global thresholds. For example, message analysis program 200 sends a high-risk warning notification when the user tries to transmit a message determined risky. In this example, the notification will display a categorical assignment of the risk rather than display a numerical percentage or probability value. In a further embodiment, the risk notification includes options to ignore the notification and transmit the message, cancel the transmission of the message, or change the message recipient to a corrected recipient. In various embodiments, the risk notification includes an option to send the message to an alternative recipient predicted by a cognitive model (e.g. cognitive model 126).

In some embodiments, message analysis program 200 may transmit the warning notification to user computing device 104 using a plurality of transmission methods including, but not limited to, GUI prompt, short message service (SMS), email, push notification, automated phone call, text-to-speech etc. For example, a user receives a push notification on user computing device 104 after attempting to transmit a message that exceeded the risk score. In one embodiment, message analysis program 200 may utilize text-to-speech methods to provide auditory risk notifications or warnings to the user. In this embodiment, message analysis program 200 may utilize NLP to receive and analyze the user response (e.g., send or block the message). For example, after message analysis program 200 transmitted a false positive (i.e., a risk score that incorrectly applied a risk notification to a correct recipient), the user can provide feedback (e.g. the intended recipient) and/or an error score to a cognitive model.

If message analysis program 200 determines that the risk score does not exceed the threshold ("no" branch, decision block 212), then message analysis program 200 transmits the user message (step 216). In an embodiment, message analysis program 200 allows the original transmission method (e.g., text message, email, instant message, etc.) to continue through its normal messaging process and subsequently transmit the user message. In another embodiment, message analysis program 200 allows the message to be transmitted by allowing external access (unblocking) to the messaging application (e.g., application 108 and application 114).

Message analysis program 200 logs the message into chat history (step 218). In one embodiment, message analysis program 200 logs the message into chat history 124. In an example embodiment, message analysis program 200 may receive user feedback through a graphical user interface on user computing device 104 (not depicted). For example, after message analysis program 200 analyzes the message, the user can provide feedback for the message and the predicted recipient on the user interface (e.g., user interface 106) of user computing device 104. In an embodiment, feedback may include a simple positive or negative response. In another embodiment, feedback may include a user confirmation of the intended recipient. For example, if message analysis program 200 incorrectly identified the user message as risky or predicted the wrong recipient, the user can provide negative feedback and correct the recipient. In an embodiment, message analysis program 200 feeds the user feedback and the corrected recipient into cognitive model 126, allowing message analysis program 200 to adjust the classification model. In another embodiment, message analysis program 200 may use one or more techniques of NLP to log whether the response of the user is positive or negative.

FIG. 3 depicts example conversation 300, which is an example of a conversation between two employees in a mixed business/personal context. Example conversation 300 includes a series of messages between the user (Minerva) and a recipient (Fai). Furthermore, each message is time-stamped relative to when Minerva sent a message and when Minerva received a message.

Figure 4:
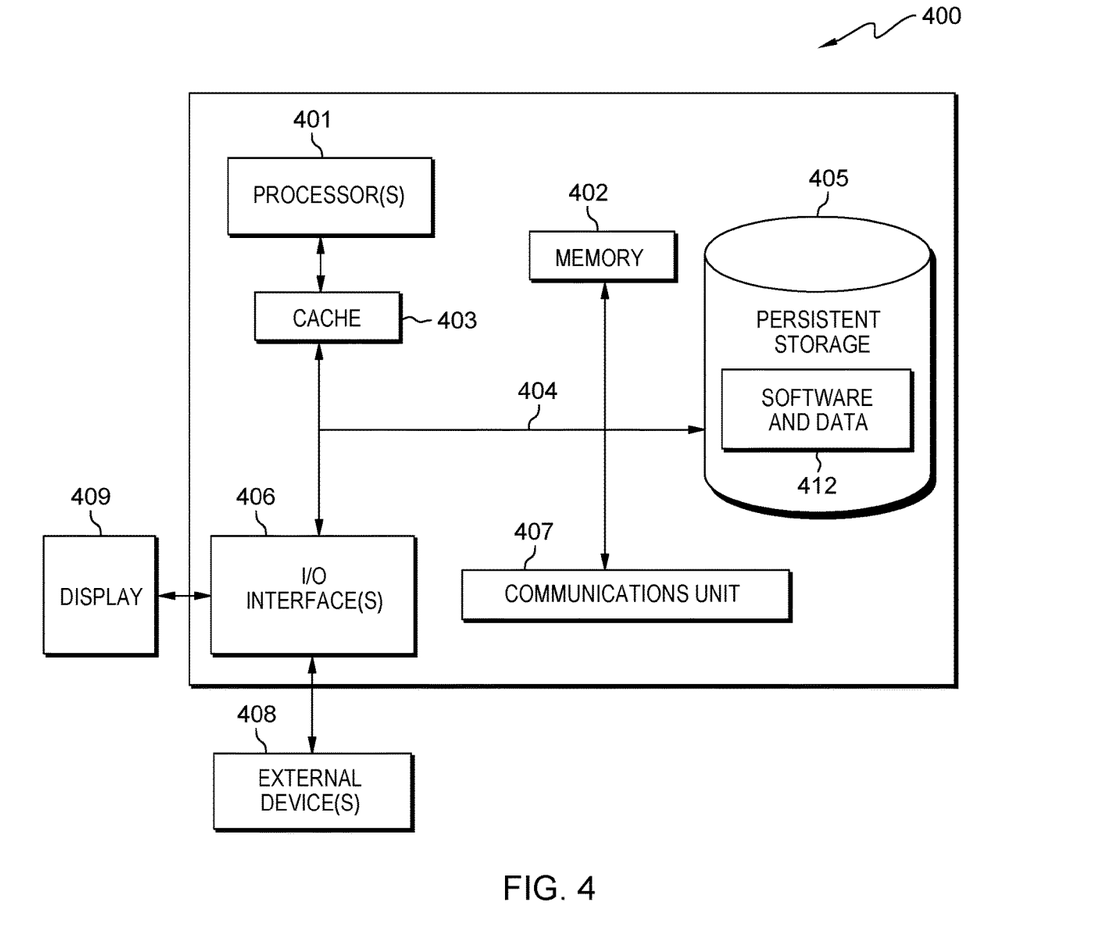
FIG. 4 is a block diagram of components of the computer executing the message analysis program within the computational environment of FIG. 1, in accordance with an embodiment of the present invention.

FIG. 4 depicts a block diagram of components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 includes communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Message analysis program 200 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Message analysis program 200 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., Message analysis program 200, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    detecting, by one or more computer processors, a message from a user to a selected recipient and holding the transmission of the detected message until a risk score is determined;
    extracting, by one or more computer processors, message information from the detected message;
    categorizing, by one or more computer processors, the extracted message information based on a degree of message formality, wherein the categories of message formality include business, professional, familial, and casual;
    retrieving, by one or more computer processors, one or more historical conversations between the user and the selected recipient of the detected message;
    training, by one or more computer processors, a multilayer perceptron with the one or more retrieved historical conversations between the user and the selected recipient; determining, by one or more computer processors, the risk score corresponding to the transmission of the detected message to the selected recipient based on applying the extracted message information to the trained multilayer perceptron and the degree of message formality; and
    responsive to the risk score exceeding a threshold defined by the degree of message formality, preventing, by one or more computer processors, the transmission of the detected message.

2. The method of claim 1, wherein determining, the risk score corresponding to sending the detected message to the intended recipient based on applying the extracted message information and the retrieved historical conversations to the cognitive model further comprises:
    determining, by one or more computer processors, a probability that the selected recipient is not an intended recipient of the message.

3. The method of claim 1, wherein message information is selected from the group consisting of: message intention, sentiment, behavior, sentence complexity, word complexity, and response time.

4. The method of claim 1, further comprising:
    determining, by one or more computer processors, whether the risk score exceeds a risk threshold; and
    responsive to determining the risk score does not exceed the risk threshold, transmitting, by one or more computer processors, the message to the selected recipient.

5. The method of claim 1, further comprising:
    determining, by one or more computer processors, whether the risk score exceeds a risk threshold; and
    responsive to determining the risk score exceeds the risk threshold, transmitting, by one or more computer processors, at least one notification to the user and retaining the message until the user responds to the notification.

6. The method of claim 5, wherein the at least one notification includes information selected from the group consisting of: the detected message, the calculated risk score, the selected recipient, and an alternative recipient.

7. The method of claim 5, further comprising:
    logging, by one or more computer processors, a response of the user to the transmitted notification.

8. A computer program product comprising:
    one or more computer readable storage media and program instructions stored on the one or more computer readable storage media, the program instructions comprising:
    program instructions to detect a message from a user to a selected recipient and holding the transmission of the detected message until a risk score is determined;
    program instructions to extract message information from the detected message;
    program instructions to categorize the extracted message information based on a degree of message formality, wherein the categories of message formality include business, professional, familial, and casual;
    program instructions to retrieve one or more historical conversations between the user and the selected recipient of the detected message;
    training, by one or more computer processors, a cognitive model with the one or more retrieved historical conversations between the user and the selected recipient;
    program instructions to determine the risk score corresponding to the transmission of the detected message to the selected recipient based on applying the extracted message information to the trained cognitive model and the degree of message formality; and
    responsive to the risk score exceeding a threshold defined by the degree of message formality, preventing, by one or more computer processors, the transmission of the detected message.

9. The computer program product of claim 8, wherein the program instructions to determine the risk score corresponding to sending the detected message to the intended recipient based on applying the extracted message information and the retrieved historical conversations to the cognitive model further comprise program instructions to:
    determine a probability that the selected recipient is not an intended recipient of the message.

10. The computer program product of claim 8, wherein message information is selected from the group consisting of: message intention, sentiment, behavior, sentence complexity, word complexity, and response time.

11. The computer program product of claim 8, further comprising program instructions, stored on the one or more computer readable storage media, to:
    determine whether the risk score exceeds a risk threshold; and
    responsive to determining the risk score does not exceed the risk threshold, transmit the message to the selected recipient.

12. The computer program product of claim 8, further comprising program instructions, stored on the one or more computer readable storage media, to:
    determine whether the risk score exceeds a risk threshold; and responsive to determining the risk score exceeds the risk threshold, transmit at least one notification to the user and retaining the message until the user responds to the notification.

13. The computer program product of claim 12, wherein the at least one notification includes information selected from the group consisting of: the detected message, the calculated risk score, the selected recipient, and an alternative recipient.

14. The computer program product of claim 12, further comprising program instructions, stored on the one or more computer readable storage media, to:
log a response of the user to the transmitted notification.

15. A computer system comprising:
one or more computer processors;
one or more computer readable storage media; and
program instructions stored on the computer readable media for execution by at least one of the one or more processors, the program instructions comprising:
  program instructions to detect a message from a user to a selected recipient and holding the transmission of the detected message until a risk score is determined;
  program instructions to extract message information from the detected message;
  program instructions to categorize the extracted message information based on a degree of message formality, wherein the categories of message formality include business, professional, familial, and casual;
  program instructions to retrieve one or more historical conversations between the user and the selected recipient of the detected message;
  training, by one or more computer processors, a cognitive model with the one or more retrieved historical conversations between the user and the selected recipient;
  program instructions to determine the risk score corresponding to the transmission of the detected message to the selected recipient based on applying the extracted message information to the trained cognitive model and the degree of message formality; and
  responsive to the risk score exceeding a threshold defined by the degree of message formality, preventing, by one or more computer processors, the transmission of the detected message.

16. The computer system of claim 15, wherein the program instructions to determine the risk score corresponding to sending the detected message to the intended recipient based on applying the extracted message information and the retrieved historical conversations to the cognitive model further comprise program instructions to:
determine a probability that the selected recipient is not an intended recipient of the message.

17. The computer system of claim 15, wherein message information is selected from the group consisting of: message intention, sentiment, behavior, sentence complexity, word complexity, and response time.

18. The computer system of claim 15, further comprising program instructions, stored on the computer readable storage media for execution by at least one of the one or more processors, to:
determine whether the risk score exceeds a risk threshold; and
responsive to determining the risk score does not exceed the risk threshold, transmit the message to the selected recipient.

19. The computer system of claim 15, further comprising program instructions, stored on the computer readable storage media for execution by at least one of the one or more processors, to:
determine whether the risk score exceeds a risk threshold; and
responsive to determining the risk score exceeds the risk threshold, transmit at least one notification to the user and retaining the message until the user responds to the notification.

\* \* \* \* \*